United States Patent
Siegel et al.

(10) Patent No.: US 10,412,124 B2
(45) Date of Patent: *Sep. 10, 2019

(54) INITIATING A SERVER-DIRECTED COMMUNICATION SESSION

(71) Applicant: AT&T INTELLECTUAL PROPERTY I, L.P., Atlanta, GA (US)

(72) Inventors: Steven A. Siegel, Mendham, NJ (US); Reuben Klein, East Brunswick, NJ (US); Karen Mullis, Loganville, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 48 days.

This patent is subject to a terminal disclaimer.

(21) Appl. No.: 15/253,266

(22) Filed: Aug. 31, 2016

(65) Prior Publication Data

US 2016/0373491 A1 Dec. 22, 2016

Related U.S. Application Data

(63) Continuation of application No. 13/681,288, filed on Nov. 19, 2012, now Pat. No. 9,444,855.

(51) Int. Cl.
*H04L 29/06* (2006.01)
*H04L 29/12* (2006.01)
*H04L 29/08* (2006.01)

(52) U.S. Cl.
CPC ........ *H04L 65/1069* (2013.01); *H04L 65/105* (2013.01); *H04L 65/1006* (2013.01); *H04L 65/1016* (2013.01); *H04L 61/1541* (2013.01); *H04L 67/16* (2013.01)

(58) Field of Classification Search
CPC ............. H04L 65/1006; H04L 65/1016; H04L 65/1069; H04L 61/1541; H04L 67/16
USPC ......................................................... 709/228
See application file for complete search history.

(56) References Cited

U.S. PATENT DOCUMENTS

| | | |
|---|---|---|
| 5,828,952 A | 10/1998 | Sawyer |
| 5,858,952 A | 1/1999 | Izawa et al. |
| 6,349,222 B1 | 2/2002 | Hafiz |
| 6,654,032 B1 * | 11/2003 | Zhu .......... G06Q 10/10 709/204 |
| 6,731,609 B1 | 5/2004 | Hirni et al. |
| 6,760,423 B1 | 7/2004 | Todd |
| 6,967,933 B2 | 11/2005 | Chapuran et al. |
| 7,889,851 B2 | 2/2011 | Shah et al. |
| 8,027,447 B2 | 9/2011 | Sylvain |
| 8,194,837 B1 | 6/2012 | Weinman |
| 2004/0264455 A1 | 12/2004 | Tao |
| 2005/0174987 A1 | 8/2005 | Raghav et al. |
| 2006/0093119 A1 | 5/2006 | Wilson et al. |
| 2007/0275692 A1 | 11/2007 | Gruchala et al. |
| 2008/0120705 A1 * | 5/2008 | Beyer ................ H04L 63/0815 726/5 |
| 2008/0155104 A1 | 6/2008 | Quinn et al. |

(Continued)

*Primary Examiner* — Zi Ye

(74) *Attorney, Agent, or Firm* — Toler Law Group, PC

(57) ABSTRACT

A method includes sending, from a first device while the first device is coupled to a second device, a signal to a third device to request a server to host a server-directed service. The signal is sent as part of a communication session. The server is independent of a path of the communication session. The method also includes receiving an instruction from the third device to enable access to the server-directed service.

18 Claims, 5 Drawing Sheets

(56) References Cited

U.S. PATENT DOCUMENTS

| | | | |
|---|---|---|---|
| 2008/0293403 A1* | 11/2008 | Quon | H04L 51/04 |
| | | | 455/426.1 |
| 2009/0052413 A1* | 2/2009 | Boyacigiller | H04L 65/1069 |
| | | | 370/338 |
| 2009/0086723 A1* | 4/2009 | Henneke | H04M 7/0012 |
| | | | 370/352 |
| 2010/0061538 A1* | 3/2010 | Coleman | H04L 12/1818 |
| | | | 379/202.01 |

* cited by examiner

INITIATING A SERVER-DIRECTED COMMUNICATION SESSION

CLAIM OF PRIORITY

This application claims priority from, and is a continuation of, U.S. patent application Ser. No. 13/681,288, filed on Nov. 19, 2012, which is incorporated herein by reference in its entirety.

FIELD OF THE DISCLOSURE

The present disclosure is generally related to initiating a central server-directed communication session from an in-progress half call model communication session.

BACKGROUND

A half call model service, in which there may be two service providers providing an agreed-upon service, may enable a first party to call a second party. A half call model communication session may be established between the first party and the second party to enable real time communications between the first party and the second party. One or more additional parties may be added to the half call model communication session to enable real time communications between the parties. The half call model communication session may be an internet protocol multimedia session.

A central server-directed service, in which there is a single service provider that defines the service for both parties, may enable a first party and a second party to concurrently utilize a particular service. Central server-directed services may include, but are not limited to, gaming, enhanced communications, telepresence, multiparty editing of a file (e.g., a document, a spreadsheet, or other type of file), services based on web real-time communication (WebRTC), and combinations thereof.

Entering a common central server-directed communication session may be problematical for participants. A requestor of the central server-directed service may need to obtain one or more uniform resource identifiers (e.g., a uniform resource locator, telephone number, or both) which identify a server that will provide the central server-directed service and a session. Scheduling may be necessary for central server-directed services that have limited resources. The requestor may schedule a rendezvous time with other participants. At the rendezvous time, the requestor and other parties may use the one or more uniform resource identifiers to access the server and establish the common central server-directed communication session. Establishing the common central server-directed communication session may be a cumbersome process that inhibits spontaneous use by parties of central server-directed services.

DETAILED DESCRIPTION

Figure 1:
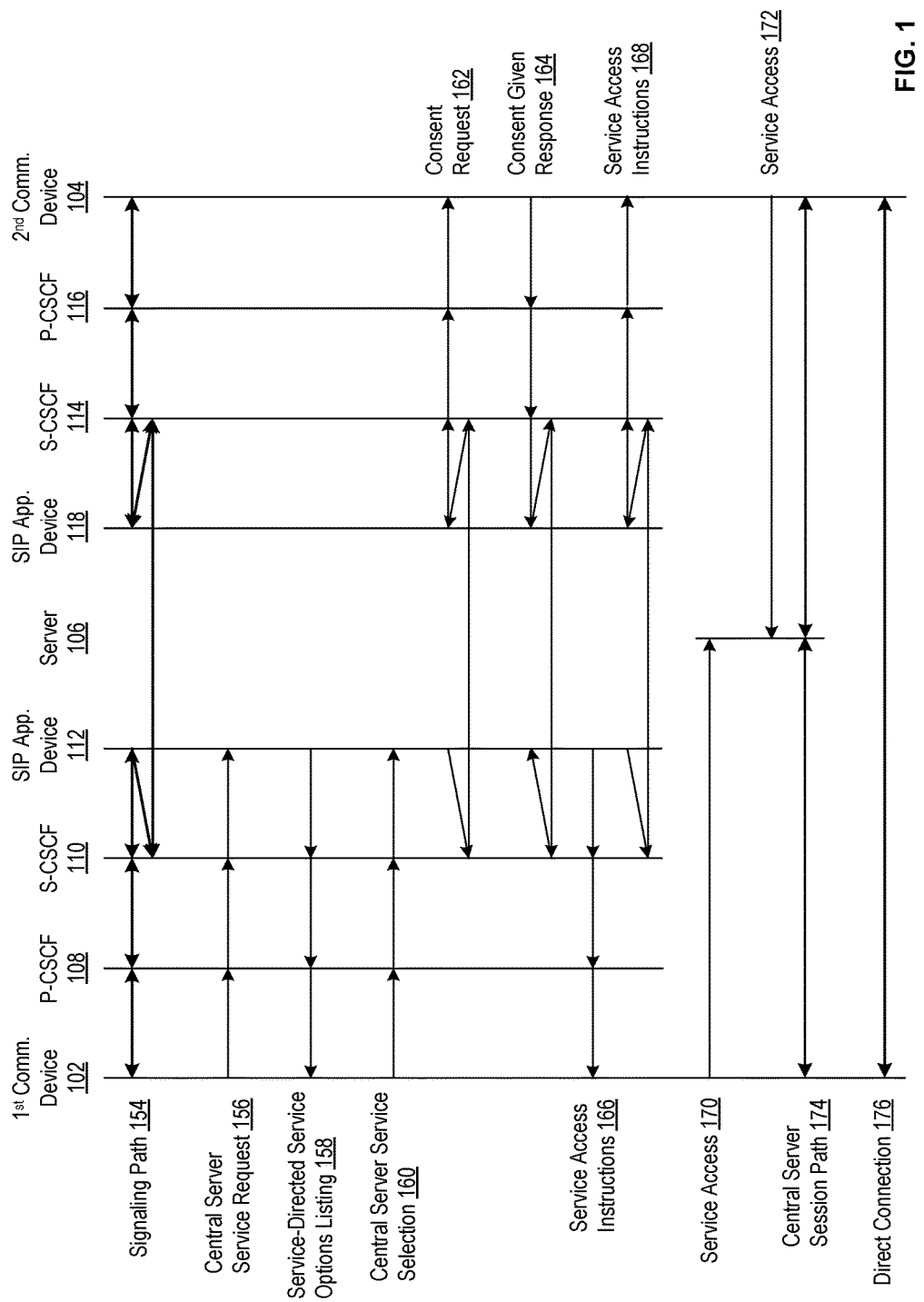
FIG. 1 is a signaling flow diagram of a first embodiment of a system to initiate a central server-directed communication session from an in-progress half call model service.

Communication devices may be used to establish a half call model communication session between two or more parties via a half call model. A signaling path of a half call model communication session may be utilized to initiate a central server-directed communication session using the same communication devices of the half call model communication session. Utilization of the signaling path of the half call model communication session to initiate the central server-directed communication session may facilitate general use of multiparty central server-directed services and spontaneous use of multiparty central server-directed services by simplifying multiparty access to a central server-directed service. The central server-directed service may utilize a server that is not part of the half call model communication session. Simplifying the multiparty access to central server-directed services may facilitate access to central server-directed services provided by a particular service provider by users of communication devices associated with other service providers.

Each user of a half call model communication session may have a separately defined half call model service provided by a service provider. That is, a half call model communication session may include a first half call model service in which a first user is connected to a first service provider, and may include a second half call model service in which a second user is connected to a second service provider. The half call model services may be bridged by the service providers to generate the half call model communication session. The half call model service provided by a service provider may be wireless service, wireline service, circuit-switched service, voice over internet protocol service, or combinations thereof. Both of the users may be associated with a particular service provider or the users may be associated with different service providers. The half call model services provided to the users work together to provide a half call model communication service. A half call model service may enable a first party to call a second party regardless of the service provider of the second party that will handle the call.

As used herein, the term "central server-directed service" refers to a single server or a set of servers that provide a service for all participants of a particular central server-directed communication session. That is, each user of a central server-directed service is connected to a central server or set of servers, as opposed to a half call model communication session in which each user is connected to a service provider associated with the user and the service provider, or service providers, bridge the communication. A central server-directed service may enable a first party and a second party to concurrently utilize a particular service defined by a single service provider to which both parties have connected.

One or more session initiation protocol application devices enable parties engaged in an internet protocol multimedia subsystem session (IMS) call to be sent to a common server that defines and orchestrates a new service. The IMS session call may use the half call model. The new service may be based on the parties accessing the same server, which can send code or other content to the parties. Enabling the parties to access the new service may enable control over a type of session and may make more varied communication possible.

In a particular embodiment, a method includes receiving a signal to invoke a central server-directed service from a first communication device at a session initiation protocol application device. The first communication device is coupled to at least one second communication device via a pathway of a half call model communication session. The method includes sending first instructions to the first communication device via the session initiation protocol device in response to the signal. The first instructions enable the first device to access the central server-directed service. The method also includes sending second instructions to the at least one second device via the session initiation protocol device in response to the signal. The second instructions enable the at least one second communication device to access the central server-directed service.

In a particular embodiment, a computer-readable device includes instructions that, when executed by a processor, cause the processor to perform a method. The method includes receiving a signal to invoke a central server-directed service from a first communication device. The first communication device is coupled to at least one second communication device via a pathway of a half call model communication session. The method includes sending first instructions to the first communication device in response to the signal. The first instructions enable the first device to access the central server-directed service. The method also includes sending second instructions to the at least one second device in response to the signal. The second instructions enable the at least one second communication device to access the central server-directed service.

In a particular embodiment, a system includes a processor and a memory accessible to the processor. The memory includes instructions executable by the processor to send a signal to invoke a particular central server-directed service as part of a communication signal in an established half call model communication session between the communication device and at least one second communication device. The memory includes instructions executable by the processor to receive instructions to enable access to the particular central server-directed service.

FIG. 1 is a signaling flow diagram of a first embodiment of a system to initiate a central server-directed communication session. The half call model communication session may be established between a first communication device 102 and a second communication device 104. Each communication device of the first communication device 102 and the second communication device 104 may be capable of communication via a half call model communication session (e.g., an internet protocol multimedia subsystem (IMS) session). Also, each communication device of the first communication device 102 and the second communication device 104 may be capable of communication with a network device. The first communication device 102 and the second communication device 104 may be, but are not limited to, mobile communication devices, personal computers, lap top computers, tablet computers, other type of computing devices, or combinations thereof. The network device may be a server 106 coupled to a public network (e.g., a wide area public network such as the internet), an IMS public service Identity (PSI) server, a server of a telephone network, another network device, or combinations thereof. The server 106 may be a web server.

The half call model communication session may be initiated by a calling party (e.g., either a user of the first communication device 102 or a user of the second communication device 104) based on an identity associated with a communication device of a called party (e.g., a phone number or a public user identity). The communication device of the called party may provide notification to the called party of a call from the calling party. The called party may establish the half call model communication session by accepting the call.

The half call model communication session may include a signaling path 154. The signaling path 154 may carry information between the first communication device 102 and the second communication device 104. The information may include call data (e.g., voice data, video data, other data or combinations thereof) carried from the first communication device 102 to the second communication device 104 and carried from the second communication device 104 to the first communication device 102. The information may also include control signals (e.g., signals related to the half call model communication session, such as INFO messages, REFER requests, INVITE requests, etc.) to devices 102, 104, and 108-118 in the signaling path 154. In some embodiments, the control signals do not follow the signaling path 154.

Information sent from the first communication device 102, other than a signal to initiate a central server-directed session, may pass to a proxy call session control function (P-CSCF) 108 associated with the first communication device 102, pass to a serving call session control function (S-CSCF) 110 associated with the first communication device 102, pass to a session initiation protocol (SIP) application device 112 associated with the first communication device 102, pass back to the S-CSCF 110, pass to a S-CSCF 114 associated with the second communication device 104, pass to a SIP application device 118 associated with the second calling device 104, pass back to the S-CSCF 114, pass to a P-CSCF 116 associated with the second communication device 104, and pass to the second communication device 104 along the signaling path 154. The SIP application device 112 may monitor information that passes through the SIP application device 112 for a signal from the first communication device 102 to initiate a central server-directed session. When the SIP application device 112 receives the signal to initiate the central server-directed session from the first communication device 102, the SIP application device 112 may remove the signal from the signaling path 154 and initiate communications to establish the central server-directed session.

Information sent from the second communication device 104, other than a signal to initiate a central server-directed session, may pass to the P-CSCF 116 associated with the second communication device 104, pass to the S-CSCF 114 associated with the second communication device 104, pass to the SIP application device 118 associated with the second communication device 104, pass back to the S-CSCF 114, pass to the S-CSCF 110 associated with the first communication device 102, pass to the SIP application device 112 associated with the first communication device 102, pass back to the S-CSCF 110, pass to the P-CSCF 108, and pass to the first communication device 102 along the signaling path 154. The SIP application device 118 may monitor information that passes through the SIP application device 118 for a signal from the second communication device 104 to initiate a central server-directed session. When the SIP application device 118 receives the signal to initiate the central server-directed session from the second communication device 104, the SIP application device 118 may remove the signal from the signaling path 154 and initiate communications to establish the central server-directed session.

Each CSCF 108, 110, 114, 116 may be part of a telephony system. Each S-CSCF 110, 114 may serve a group of customers. Each P-CSCF 108, 116 may be chosen based on standards associated with the telephony system. Wired, wireless, and Wi-Fi access from a given location may be directed through different P-CSCFs. Each telephony system may include one or more telephony application servers, telephony devices, or both. In some situations, the S-CSCF 110 and the P-CSCF 108 may be the same device depending on a customer identity associated with the first communication device 102, a location of the first communication device 102, a service used by the first communication device 102, or combinations thereof. In some situations, the S-CSCF 114 and the P-CSCF 116 may be the same device depending on a customer identity associated with the second communication device 104, a location of the second communication device 104, a service used by the second communication device 104, or combinations thereof. The particular P-CSCF 108 and the particular P-CSCF 116 may change during the half call model communication session. The S-CSCF 110 and the S-CSCF 114 may be the same server and the SIP application device 112 and the SIP application device 118 may be the same device when the first communication device 102 and the second communication device 104 are both associated with customers of the customer group served by the S-CSCF 110.

In an embodiment, the SIP application device 112 is part of a first telephony system that serves a first customer group associated with the S-CSCF 110 and the SIP application device 118 is part of a second telephony system that serves a second customer group associated with the S-CSCF 114. The first telephony system may include the S-CSCF 110 associated with the first communication device 102 and the second telephony system may include the S-CSCF 114 associated with the second communication device 104. In another embodiment, the SIP application device 112 and the SIP application device 118 are incorporated in a single server in the signaling path 154. The single server may not include CSCF functionality.

The calling party or the called party may invoke a central server-directed service during the half call model communication session. In the embodiment depicted in FIG. 1, the central server-directed service request 156 is added by the first communication device 102 to the information sent from the first communication device 102 via the signaling path 154. The central server-directed request 156 may be added to the information by the first communication device 102 in response to user input received by the first communication device 102. The user input may be selection of an option, activation of a key or a key sequence, or another form of user input that causes the first communication device 102 to send the central server-directed service request 156 without the central server-directed service request 156 specifying a particular central server-directed service to invoke. The central server-directed service request 156 may be an INFO message.

The SIP application device 112 may detect the central server-directed service request 156 and remove the central server-directed service request 156 from the information sent along the signaling path 154. The SIP application server 112 may access information local to the SIP application device 112, information from another networked device, or both, to determine central server-directed services that the first communication device 102 is enabled to access. The central server-directed services that the first communication device 102 is enabled to access may include subscribed services, services available to all communication devices, or both. The SIP application device 112 may generate a central server-directed service options listing 158 and send the central server-directed service options listing 158 to the first communication device 102 in response to the central server-directed service request 156. The SIP application device 112 may add the central server-directed service options listing 158 (e.g., as an INFO message) to the information that is sent along the portion of the signaling path 154 from the SIP application device 112 to the first communication device 102.

In response to receipt of the central server-directed service options listing 158, the first communication device 102 may send a listing of available services to a display device associated with the first communication device 102. The user of the first communication device 102 may make a selection of a central server-directed service from the listing of available services. Alternately, the first communication device 102 may select the central server-directed service based on user configured settings. The listing of available services may include subscribed services associated with the first communication device, recommended or available subscription services to which the first communication device is not subscribed, services available to all communication devices, or combinations thereof. The first communication device 102 may include a central server-directed service selection 160 (e.g., as an INFO message) in the information sent via the signaling path 154.

The SIP application device 112 may detect the central server-directed service selection 160 and remove the central server-directed service selection 160 from the information sent along the signaling path 154. The SIP application device 112 may determine a central server-directed service to invoke based on the central server-directed service selection 160. In some embodiments, the central server-directed service request 156 may specify a central server-directed service to invoke. When the central server-directed service is included in the central server-directed service request 156, the central server-directed service options listing 158 and the central server-directed service selection 160 are not needed.

The SIP application device 112 may access information local to the SIP application device 112, information from another networked device, or both, to determine whether the second communication device 104 is able to access the central server-directed service determined from the central server-directed service selection 160 or received in the central server-directed service request 156 when the central server-directed service request 156 specifies the central server-directed service. When the second communication device 104 is not able to access the central server-directed service, a notification may be sent to the first communication device 102 to inform the user of the first communication device 102 that a request for a central server-directed communication session implementing the central server-directed service cannot be accommodated.

When the second communication device 104 is able to access the central server-directed service, the SIP application device 112 may determine whether consent from the second communication device 104 is needed. When consent is needed, the SIP application device 112 may add a consent request 162 (e.g., as an INFO message) to the information that is sent along the portion of the signaling path 154 from the SIP application device 112 to the second communication device 104. The second communication device 104 may receive the consent request 162. In an embodiment, the second communication device 104 may automatically approve the consent request 162 based on user configuration settings and send a consent given response 164 to the SIP application device 112. In an embodiment, consent may be provided by voice input of the user of the second communication device 104. In other embodiments, the second communication device 104 may send a request for consent to a display device associated with the second communication device 104. The request may provide information to the user of the second communication device 104. The information may specify the central server-directed service. When fees will be charged, or may be charged, to an account associated with the second communication device 104 in connection with the central server-directed service, the information may convey a cost notice to the user of the second communication device 104.

User input received by the second communication device 104 may consent to the central server-directed service or deny the central server-directed service. When the user input is received at the second communication device 104, the second communication device 104 may include a consent response (e.g., as an INFO signal) that is included in the information sent via the signaling path 154. The consent response may travel along a portion of the signaling path 154 to the SIP application device 112. The SIP application device 112 may remove the consent response from the signaling path 154 and send one or more commands based on the consent response. When the response to the request is consent, the consent response is a consent given response 164.

The SIP application device 112 may monitor the signaling path 154 for the consent response. When a negative consent response is received, or after passage of a determined amount of time without receipt of the consent response when passage of the determined amount of time is considered denial of consent, the SIP application device may send a notification to the first communication device 102 that the central server-directed communication session will not be established.

When the SIP application device 112 receives the consent given response 164, or after passage of the determined amount without receipt of the consent response when the passage of the determined amount of time is considered to be consent, the SIP application device 112 may include service access instructions 166 for the first communication device 102 (e.g., as an INFO message) in the information sent to the first communication device 102 along the portion of the signaling path 154 from the SIP application device 112 to the first communication device 102. The SIP application device 112 may also include service access instructions 168 for the second communication device 104 (e.g., as an INFO message) in the information sent to the second communication device 104 along the portion of the signaling path 154 from the SIP application device 112 to the second communication device 104.

In some embodiments, the SIP application device 112 may establish the central server-directed communication session without obtaining consent from the second communication device 104. When consent is not needed, the consent request 162 and the processing of a consent given response 164 may be omitted. The SIP application device 112 may send the service access instructions 166 to the first communication device 102 and the service access instructions 168 to the second communication device 104 after determination of the central server-directed service.

The service access instructions 166 may include a token specific to the first communication device 102 that enables the first communication device 102 to connect to the server 106 that provides the central server-directed service without additional authentication. The service access instructions 168 may include a token specific to the second communication device 104 that enables the second communication device 104 to connect to the server 106 that provides the central server-directed service without additional authentication. The service access instructions 166, 168 may include a uniform resource locator to access the central server-directed service and a particular session at the server 106.

In an embodiment, the first communication device 102 may receive the service access instructions 166 and automatically execute the service access instructions 166 to provide service access 170 to the server. In another embodiment, instructions detailing how to access the server 106 based on the service access instructions 166 may be sent to the display device associated with the first communication device 102. User input received at the first communication device 102 may enable the first communication device 102 to establish the service access 170 to the server 106.

In an embodiment, the second communication device 104 may receive the service access instructions 168 and automatically execute the service access instructions 168 to provide service access 172 to the server 106. In another embodiment, instructions detailing how to access the server 106 based on the service access instructions 168 may be sent to the display device associated with the second communication device 104. User input received at the second communication device 104 may enable the first communication device 102 to establish the service access 172 to the server 106.

When both the first communication device 102 and the second communication device 104 are coupled to the server 106, the central server-directed communication session may be established. Communications between the first communication device 102 and the second communication device 104 during the central server-directed communication session may be conducted via a central server-directed path 174. In an embodiment, the service access instructions 166, 168 may enable creation of a direct connection 176 between the first communication device 102 and the second communication device 104. The direct connection 176 may eliminate the need for continued use of the server 106, or the direct connection 176 may be in addition to the central server-directed path 174. In an embodiment, the signaling path 154 is ended after the central server-directed path 174 is established. In other embodiments, the signaling path 154 is maintained after the central server-directed path 174 is established.

Figure 2:
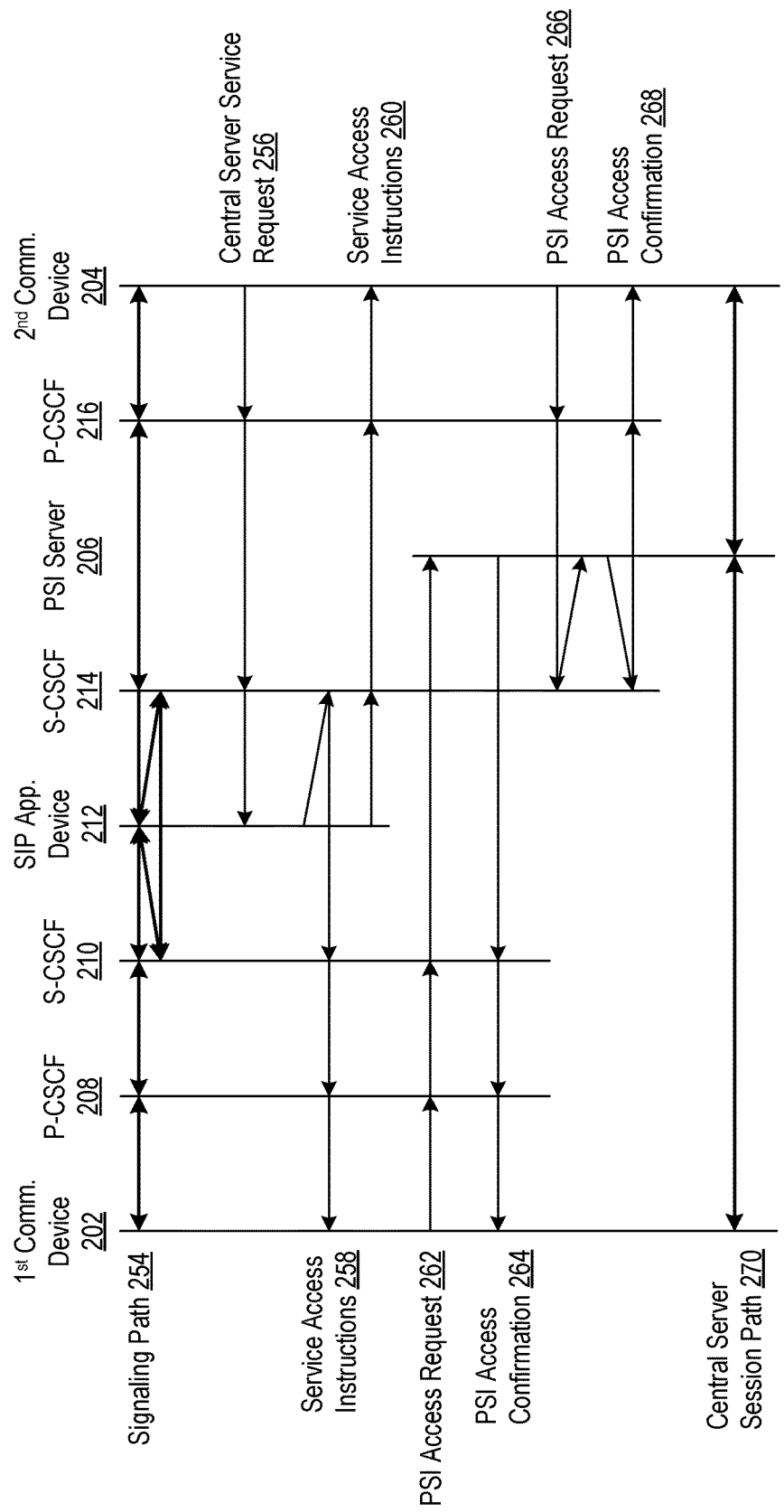
FIG. 2 is a signaling flow diagram of a second embodiment of a system to initiate a central server-directed communication session from an in-progress half call model service.

FIG. 2 is a signaling flow diagram of a second embodiment of a system to initiate a central server-directed communication session. A half call model communication session may be established between a first communication device 202 and a second communication device 204. Each communication device of the first communication device 202 and the second communication device 204 may be capable of communication via a half call model communication session (e.g., an internet protocol multimedia subsystem (IMS) session). Also, each communication device of the first communication device 202 and the second communication device 204 may be capable of communication with a network device. The first communication device 202 and the second communication device 204 may be, but are not limited to, mobile communication devices, personal computers, lap top computers, tablet computers, other type of computing devices, or combinations thereof. The network device may be a Public Service Identity PSI server 206 that is a component of the IMS.

The half call model communication session may be initiated by a calling party (e.g., either a user of the first communication device 202 or a user of the second communication device 204) based on an identity associated with a communication device of a called party (e.g., a phone number or a public user identity). The communication device of the called party may provide notification to the called party of a call from the calling party. The called party may establish the half call model communication session by accepting the call.

The half call model communication session may include a signaling path 254. The signaling path 254 may carry information between the first communication device 202 and the second communication device 204. The information may include call data (e.g., voice data, video data, other data or combinations thereof) carried from the first communication device 202 to the second communication device 204 and carried from the second communication device 204 to the first communication device 202. The information may also include control signals (e.g., signals related to the half call model communication session, such as INFO messages, REFER requests, INVITE requests, etc.) to devices 202, 204, and 208-216 in the signaling path 254. In some embodiments, the control signals do not follow the signaling path 254.

Information sent from the first communication device 202, other than a signal to initiate a central server-directed session, may pass to a P-CSCF 208 associated with the first communication device 202, pass to a S-CSCF 210 associated with the first communication device 202, pass to a SIP application device 212, pass back to the S-CSCF 210, pass to a S-CSCF 214 associated with the second communication device 204, pass to the SIP application device 212, pass back to the S-CSCF 214, pass to a P-CSCF 216 associated with the second communication device 204, and pass to the second communication device 204 along the signaling path 254. The SIP application device 212 may monitor information that passes through the SIP application device 212 for a signal from the first communication device 202 to initiate a central server-directed session. When the SIP application device 212 receives the signal to initiate the central server-directed session from the first communication device 202, the SIP application device 212 may remove the signal from the signaling path 254 and initiate communications to establish the central server-directed session.

Information sent from the second communication device 204, other than a signal to initiate a central server-directed session, may pass to the P-CSCF 216 associated with the second communication device 204, pass to the S-CSCF 214 associated with the second communication device 204, pass to the SIP application device 212, pass back to the S-CSCF 214, pass to the S-CSCF 210 associated with the first communication device 202, pass to the SIP application device 212, pass back to the S-CSCF 210, pass to the P-CSCF 208 associated with the first communication device 202, and pass to the first communication device 202 along the signaling path 254. The SIP application device 212 may monitor information that passes through the SIP application device 212 for a signal from the second communication device 204 to initiate a central server-directed session. When the SIP application device 212 receives the signal to initiate the central server-directed session from the second communication device 204, the SIP application device 212 may remove the signal from the signaling path 254 and initiate communications to establish the central server-directed session.

Each CSCF 208, 210, 214, 216 may be part of a telephony system. Each S-CSCF 210, 214 may serve a group of customers. Each P-CSCF 208, 216 may be chosen based on standards associated with the telephony system. Wired, wireless, and Wi-Fi access from a given location may be directed through different P-CSCFs. Each telephony system may include one or more telephony application servers, telephony devices, or both. In some situations, the S-CSCF 210 and the P-CSCF 208 may be the same device depending on a customer identity associated with the first communication device 202, a location of the first communication device 202, a service used by the first communication device 202, or combinations thereof. In some situations, the S-CSCF 214 and the P-CSCF 216 may be the same device depending on a customer identity associated with the second communication device 204, a location of the second communication device 204, a service used by the second communication device 204, or combinations thereof. The particular P-CSCF 208 and the particular P-CSCF 216 may change during the half call model communication session. The S-CSCF 210 and the S-CSCF 214 may be the same server when the first communication device 202 and the second communication device 204 are both associated with customers of the customer group served by the S-CSCF 210.

The calling party or the called party may invoke a central server-directed service during the half call model communication session. In the embodiment depicted in FIG. 2, the central server-directed service request 256 is added by the second communication device 204 to the information sent from the second communication device 204 via the signaling path 254. The central server-directed request 256 may be added to the information by the second communication device 204 in response to user input received by the second communication device 204. The user input may be selection of an option, activation of a key or a key sequence, or another form of user input that causes the second communication device 204 to send the central server-directed service request 256. The central server-directed service request 256 may specify a particular central server-directed service to invoke. The central server-directed service request 256 may be an INFO message.

The SIP application device 212 may access information local to the SIP application device 212, information from another networked device, or both, to determine whether the first communication device 202 is able to access the central server-directed service specified in the central server-directed service request 256. When the first communication device 202 is not able to access the central server-directed service, a notification may be sent to the second communication device 204 to inform the user of the second communication device 204 that a request for a central server-directed communication session implementing the central server-directed service cannot be accommodated.

When the first communication device 202 is able to access the central server-directed service, the SIP application device 212 may determine whether consent from the first communication device 202 is needed. When consent is needed, consent may be obtained from the user of the first communication device 202 before initiating the central server-directed communication session. When consent is not needed, or after consent is obtained, the SIP application device 212 may send service access instructions 258 (e.g., as a REFER request) along a portion of the signaling path 254 from the SIP application device 212 to the first communication device 202. The SIP application device 212 may also send service access instructions 260 (e.g., as a REFER request) along a portion of the signaling path 254 from the SIP application device 212 to the second communication device 204.

The service access instructions 258 may include a token specific to the first communication device 202 that enables the first communication device 202 to connect to the PSI server 206 that provides the central server-directed service without additional authentication. The service access instructions 260 may include a token specific to the second communication device 204 that enables the second communication device 204 to connect to the PSI server 206 that provides the central server-directed service without additional authentication. The service access instructions 258, 260 may include a uniform resource locator to access the central server-directed service and a particular session at the PSI server 206.

The first communication device 202 may send a PSI access request 262 to the PSI server 206 based on the service access instructions 258 (e.g., as an INVITE request). The PSI access request 262 may follow a portion of the signaling path 254 to the S-CSCF 210. The PSI access request 262 may pass from the S-CSCF 210 to the PSI server 206. In response to the PSI access request 262, the PSI server 206 may send a PSI access confirmation 264 (e.g., as a 200 OK acknowledgement) back to the first communication device 202.

The second communication device 204 may send a PSI access request 266 to the PSI server 206 based on the service access instructions 260 (e.g., as an INVITE request). The PSI access request 266 may follow a portion of the signaling path 254 to the S-CSCF 214. The PSI access request 266 may pass from the S-CSCF 214 to the PSI server 206. In response to the PSI access request 266, the PSI server 206 may send a PSI access confirmation 268 (e.g., as a 200 OK acknowledgement) back to the second communication device 204.

When both the first communication device 202 and the second communication device 204 are coupled to the PSI server 206, the central server-directed communication session may be established. Communications between the first communication device 202 and the second communication device 204 during the central server-directed communication session may be conducted via a central server-directed path 270. In an embodiment, the signaling path 254 is ended after the central server-directed path 270 is established. In other embodiments, the signaling path 254 is maintained after the central server-directed path 270 is established.

Figure 3:
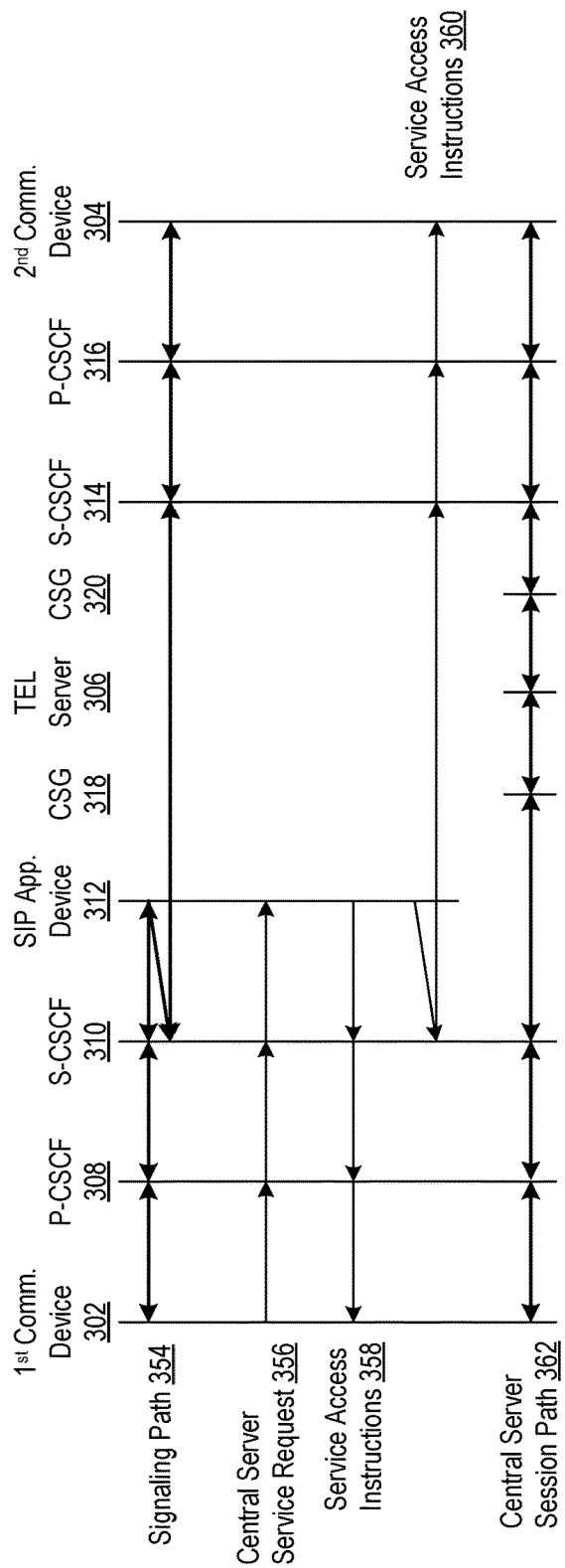
FIG. 3 is a signaling flow diagram of a third embodiment of a system to initiate a central server-directed communication session from an in-progress half call model service.

FIG. 3 is a signaling flow diagram of a third embodiment of a system to initiate a central server-directed communication session. A half call model communication session may be established between a first communication device 302 and a second communication device 304. Each communication device of the first communication device 302 and the second communication device 304 may be capable of communication via a half call model communication session (e.g., an internet protocol multimedia subsystem (IMS) session). Also, each communication device of the first communication device 302 and the second communication device 304 may be capable of communication with a network device. The first communication device 302 and the second communication device 304 may be, but are not limited to, mobile communication devices, personal computers, lap top computers, tablet computers, other type of computing devices, or combinations thereof. The network device may be a telephony (TEL) server 306 that is a server of a circuit-switched network. The TEL server 306 may provide services such as a conference bridge.

The half call model communication session may be initiated by a calling party (e.g., either a user of the first communication device 302 or a user of the second communication device 304) based on an identity associated with a communication device of a called party (e.g., a phone number or a public user identity). The communication device of the called party may provide notification to the called party of a call from the calling party. The called party may establish the half call model communication session by accepting the call.

The half call model communication session may include a signaling path 354. The signaling path 354 may carry information between the first communication device 302 and the second communication device 304. The information may include call data (e.g., voice data, video data, other data or combinations thereof) carried from the first communication device 302 to the second communication device 304 and carried from the second communication device 304 to the first communication device 302. The information may also include control signals (e.g., signals related to the half call model communication session, such as INFO messages, REFER requests, INVITE requests, etc.) to devices 302, 304, and 308-316 in the signaling path 354. In some embodiments, the control signals do not follow the signaling path 354.

Information sent from the first communication device 302, other than a signal to initiate a central server-directed session, may pass to a P-CSCF 308 associated with the first communication device 302, pass to a S-CSCF 310 associated with the first communication device 302, pass to a SIP application device 312, pass back to the S-CSCF 310, pass to a S-CSCF 314 associated with the second communication device 304, pass to a P-CSCF 316 associated with the second communication device 304, and pass to the second communication device 304 along the signaling path 354. The SIP application device 312 may monitor information that passes through the SIP application device 312 for a signal from the first communication device 302 to initiate a central server-directed session. When the SIP application device 312 receives the signal to initiate the central server-directed session from the first communication device 302, the SIP application device 312 may remove the signal from the signaling path 354 and initiate communications to establish the central server-directed session.

Information sent from the second communication device 304 may pass to the P-CSCF 316 associated with the second communication device 304, pass to the S-CSCF 314 associated with the second communication device 304, pass to the S-CSCF 310 associated with the first communication device 302, pass to the SIP application device 312, pass back to the S-CSCF 310, pass to the P-CSCF 308 associated with the first communication device 302, and pass to the first communication device 302 along the signaling path 354. In the embodiment illustrated in FIG. 3, the second communication device 304 is not associated with a service that enables the second communication device 304 to initiate a central server-directed session. Thus, no SIP application device is associated with the second communication device 304.

Each CSCF 308, 310, 314, 316 may be part of a telephony system. Each S-CSCF 310, 314 may serve a group of customers. Each P-CSCF 308, 316 may be chosen based on standards associated with the telephony system. Wired, wireless, and Wi-Fi access from a given location may be directed through different P-CSCFs. Each telephony system may include one or more telephony application servers, telephony devices, or both. In some situations, the S-CSCF 310 and the P-CSCF 308 may be the same device depending on a customer identity associated with the first communication device 302, a location of the first communication device 302, a service used by the first communication device 302, or combinations thereof. In some situations, the S-CSCF 314 and the P-CSCF 316 may be the same device depending on a customer identity associated with the second communication device 304, a location of the second communication device 304, a service used by the second communication device 304, or combinations thereof. The particular P-CSCF 308 and the particular P-CSCF 316 may change during the half call model communication session. The S-CSCF 310 and the S-CSCF 314 may be the same server when the first communication device 302 and the second communication device 304 are both associated with customers of the customer group served by the S-CSCF 310.

The first communication device 302 may invoke a central server-directed service during the half call model communication session. In the embodiment depicted in FIG. 3, the central server-directed service request 356 is added by the first communication device 302 to the information sent from the first communication device 302 via the signaling path 354. The central server-directed request 356 may be added to the information by the first communication device 302 in response to user input received by the first communication device 302. The user input may be selection of an option, activation of a key or a key sequence, or another form of user input that causes the first communication device 302 to send the central server-directed service request 356. The central server-directed service request 356 may specify a particular central server-directed service to invoke. The central server-directed service request 356 may be an INFO message.

The SIP application device 312 may access information local to the SIP application device 312, information from another networked device, or both, to determine whether the second communication device 304 is able to access the central server-directed service specified in the central server-directed service request 356. When the second communication device 304 is not able to access the central server-directed service, a notification may be sent to the first communication device 302 to inform the user of the first communication device 302 that a request for a central server-directed communication session implementing the central server-directed service cannot be accommodated.

When the second communication device 304 is able to access the central server-directed service, the SIP application device 312 may determine whether consent from the second communication device 304 is needed. When consent is needed, consent may be obtained from the user of the second communication device 304 before initiating the central server-directed communication session. When consent is not needed, or after consent is obtained, the SIP application device 312 may send service access instructions 358 (e.g., as a REFER request) along a portion of the signaling path 354 from the SIP application device 312 to the first communication device 302. The SIP application device 312 may also send service access instructions 360 (e.g., as a REFER request) along a portion of the signaling path 354 from the SIP application device 312 to the second communication device 304.

The service access instructions 358 may include a token specific to the first communication device 302 that enables the first communication device 302 to connect to the TEL server 306 that provides the central server-directed service without additional authentication. The service access instructions 360 may include a token specific to the second communication device 304 that enables the second communication device 304 to connect to the TEL server 306 that provides the central server-directed service without additional authentication. The service access instructions 358, 360 may include a uniform resource identifier to access the central server-directed service and a particular session at the TEL server 306.

The first communication device 302 may execute the service access instructions 358 and the second communication device 304 may execute the service access instructions 360 to connect to the TEL server 306. When both the first communication device 302 and the second communication device 304 are coupled to the TEL server 306, the central server-directed communication session may be established. Communications between the first communication device 302 and the second communication device 304 during the central server-directed communication session may be conducted via a central server-directed path 362. The central server-directed path 362 may include at least the first communication device 302, the P-CSCF 308, the S-CSCF 310, a circuit switched gateway (CSG) 318 associated with the first communication device 302, the TEL server 306, a CSG 320 associated with the second communication device 304, the S-CSCF 314, the P-CSCF 316, and the second communication device 304. In an embodiment, the signaling path 354 is ended after the central server-directed path 362 is established. In other embodiments, the signaling path 354 is maintained after the central server-directed path 362 is established.

Figure 4:
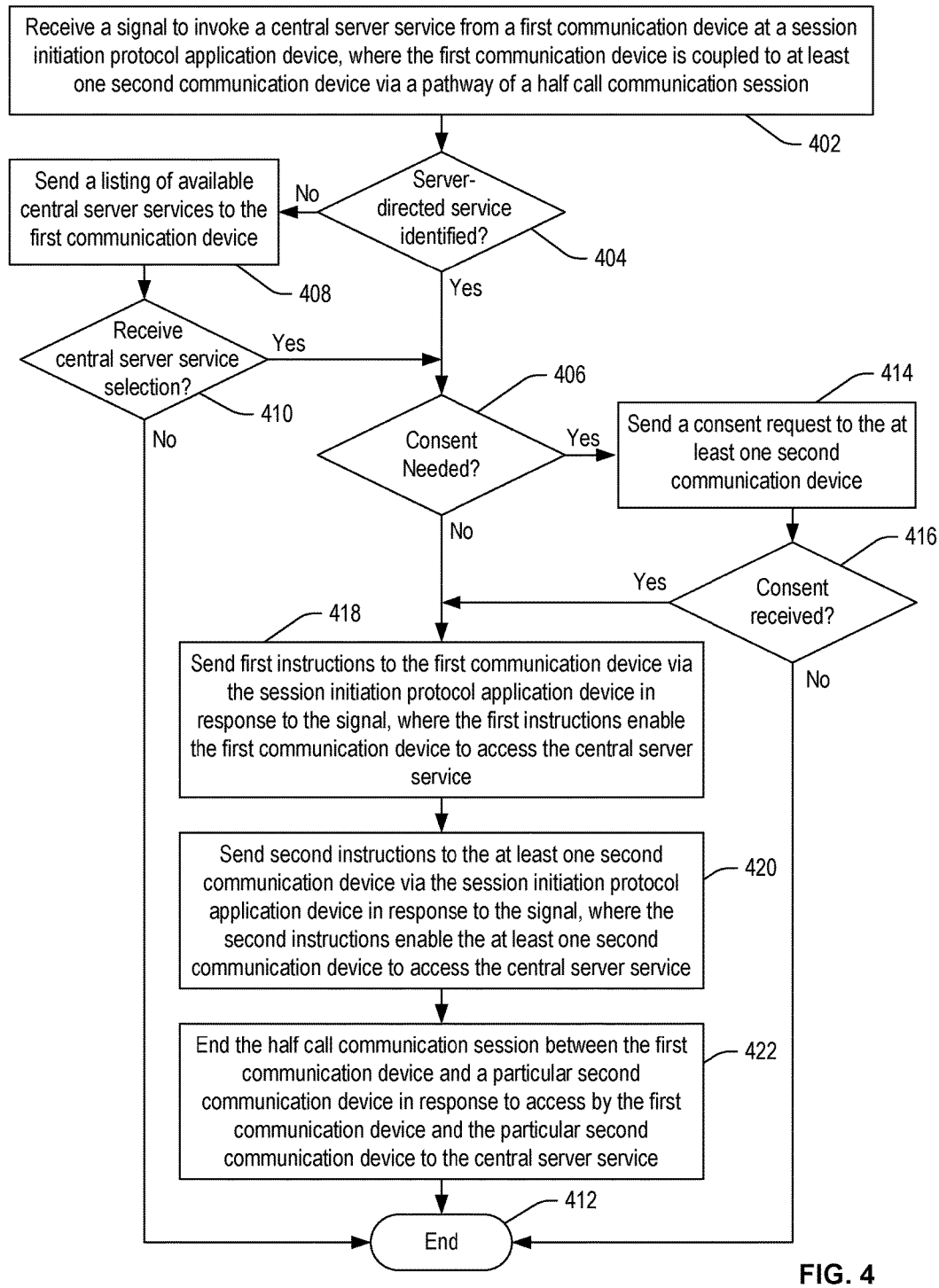
FIG. 4 is a flow chart of an embodiment of a method to initiate a central server-directed communication session from an in-progress half call model service.

Referring to FIG. 4, a flow chart of a first particular embodiment of a method to initiate a central server-directed communication session. In an embodiment, the method may be performed by a session initiation protocol (SIP) application device (e.g., one of the SIP application devices 112, 118, 212, and 312 depicted in FIGS. 1-3). In an embodiment, the SIP application device is a telephony application server associated with a communication device that initiates a central server-directed communication session. In another embodiment, the SIP application server is a dedicated server in a signaling path between a first communication device and one or more second communication devices coupled to the first communication device by the half call model communication session.

At 402, a signal to invoke a central server-directed service may be received from a first communication device at the SIP application device. The first communication device is coupled to at least one second communication device via a pathway of a half call model communication session.

A determination that the central server-directed service is identified in the signal may be made, at 404. When the central server-directed service is identified in the signal, at 404, the method may continue, at 406. When the central server-directed service is not identified in the signal, a listing of available central server-directed services may be sent to the first communication device, at 408. The listing may include central server-directed services available to all devices, subscription central server-directed services associated with the first communication device, recommended services, or combinations thereof. When selection of the central server-directed service is received, at 410, the method may continue, at 406. When selection of the central server-directed service is not received, at 410, the method may end, at 412.

At 406, a determination may be made whether consent to initiate the central server-directed service is needed from the one or more second communication devices. In some embodiments, consent to initiate the central server-directed service may be sought from a communication device of the one or more second communication devices when initiating the central server-directed service will result in, or may result in, a charge to an account associated with the communication device. When consent is needed, at 406, a consent request may be sent to the at least one second communication device, at 414. A determination that consent was received for the at least one second communication device may be made, at 416. The method may continue, at 418, for each communication device of the at least one second communication device for which consent is received. For each communication device of the at least one second communication device for which consent was not received (e.g., either by receipt of denial of consent or by passage of a time limit without a response), the method may end, at 412. When consent is not needed, at 406, the method may continue, at 418.

At 418, first instructions may be sent to the first communication device via the SIP application device. The first instructions may enable the first communication device to access the central server-directed service. In an embodiment, the first communication device automatically executes the first instructions to enable the first communication device to connect to the central server-directed service. The half call model communication session may be a secure session and the identities of the first communication device and the at least one second communication device may be authenticated during establishment of the half call model communication session. A token may be included in the first instructions. The token may enable access to the central server-directed service by the first communication device without additional authentication.

In another embodiment, the first communication device is not enabled (e.g., configured) to automatically execute the first instructions, or is not able to automatically execute the first instructions. In this embodiment, the first instructions may be sent as output to a display device of the first communication device (e.g., as a pop-up window). User interaction (e.g., selection of a URL in the output, or copying the URL and pasting the URL into a browser) may be required for the first communication device to access the central server-directed service.

Second instructions may be sent to one or more communication devices of the at least one second communication device, at 420. The second instructions may be sent to each communication device of the at least one second communication device when no consent to initiate the central server-directed service is needed. The second instructions may be sent to each communication device of the at least one communication device for which consent was granted when consent to initiate the central server-directed service is needed. The second instructions may enable each second communication device that received the second instructions to access the central server-directed service. In an embodiment, a particular second communication device that received the second instructions may automatically execute the second instructions to enable the particular second communication device to connect to the central server-directed service. The half call model communication session may be a secure session and the identities of the first communication device and the at least one second communication device may be authenticated during establishment of the half call model communication session. A token specific to the particular second communication device may be included in the second instructions received by the particular second communication device. The token may enable access to the central server-directed service by the second communication device without additional authentication.

In another embodiment, a particular second communication device that receives the second instructions is not enabled (e.g., configured) to automatically execute the second instructions, or is not able to automatically execute the second instructions. In this embodiment, the second instructions may be sent as output to a display device of the particular communication device (e.g., as a pop-up window). User interaction (e.g., selection of a URL in the output, or copying the URL and pasting the URL into a browser) may be required for the particular second communication device to access the central server-directed service.

The half call model communication session between the first communication device and a particular second communication device may be ended in response to access by the first communication device and the particular second communication device to the central server-directed service to establish the central server-directed communication session, at 422. Whether the half call model communication session is ended so that all communications are through the central server-directed service may be decided by the particular central server-directed service. For example, when the central server-directed service (e.g., a service provided by the PSI server 206 depicted in FIG. 2) is accessed by INVITE requests sent along the signal path of the half call model communication session, the half call model communication session may be ended after the central server-directed communication session is established. The method may end, at 412.

Various embodiments disclosed herein initiation of a central server-directed communication session between communication devices that are coupled in a half call model communication session. Signaling paths of the half call model communication session may be utilized to initiate a central server-directed communication session using the same communication devices of the half call model communication session. Utilization of the signaling paths of the half call model communication session to initiate the central server-directed communication session may facilitate general use of multiparty central server-directed services and spontaneous use of multiparty central server-directed services by simplifying multiparty access to a central server-directed service. Simplifying the multiparty access to central server-directed servers may facilitate access to central server-directed services provided by a particular service provider by users of communication devices associated with other service providers.

Figure 5:
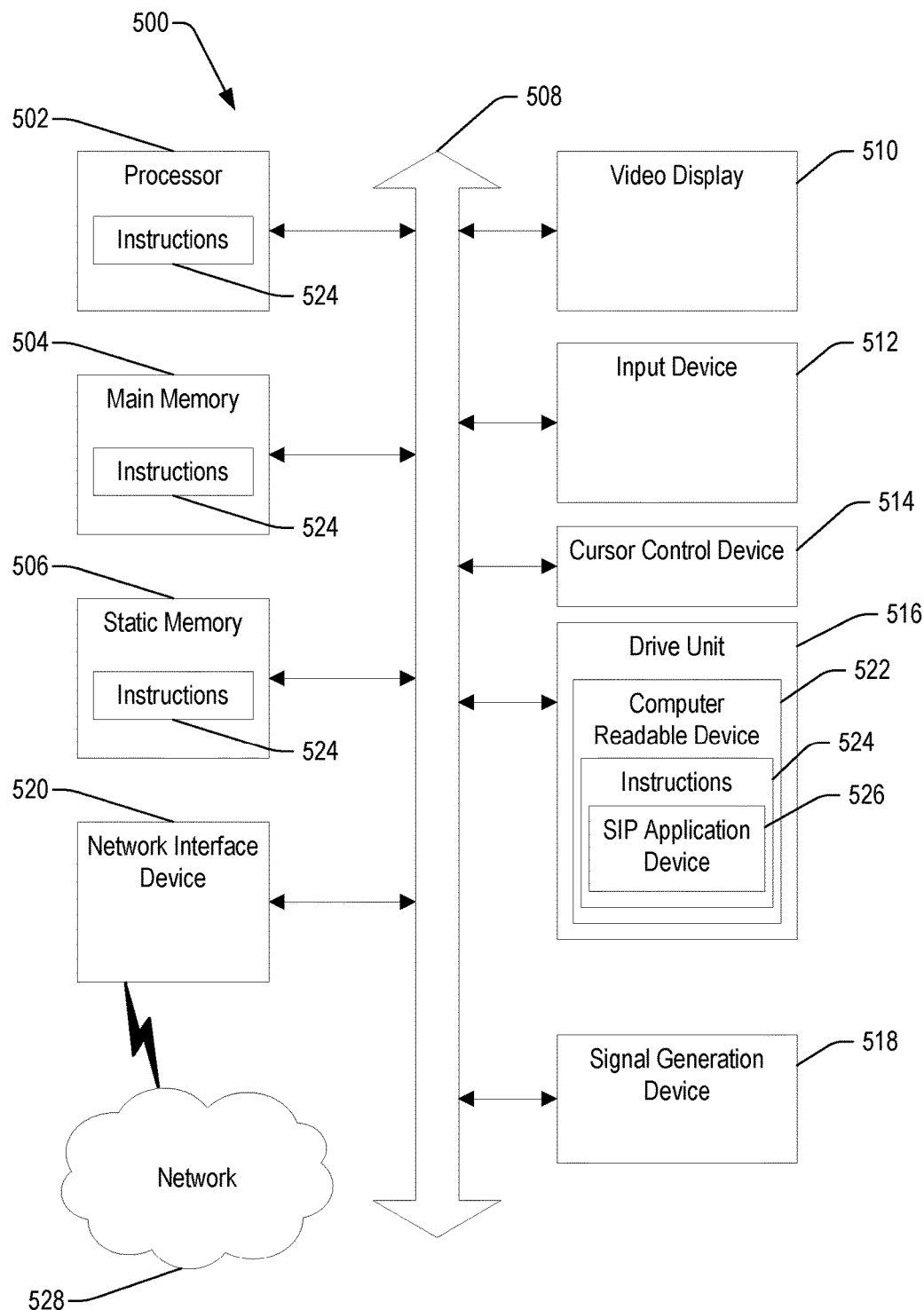
FIG. 5 is a block diagram of an illustrative embodiment of a general computer system.

Referring to FIG. 5, an illustrative embodiment of a general computer system is shown and is designated 500. The computer system 500 may include a set of instructions that can be executed to cause the computer system 500 to perform any one or more of the methods or computer based functions disclosed herein. The computer system 500 may operate as a standalone device or may be connected, e.g., using a network, to other computer systems or peripheral devices. For example, the computer system 500 may include or be included within any one or more of the first communication devices 102, 202, 302; the second communication devices 104, 204, 304, the server 106, the PSI server 206, the TEL server 306, and telephony devices that include call one or more service control functions (CSCFs) 108, 208, 210, 110, 210, 310, 114, 214, 314, 116, 216, 316, SIP application devices 112, 118, 212, 312, the CSGs 318, 320 or combinations thereof described with reference to FIGS. 1-3.

In a networked deployment, the computer system 500 may operate in the capacity of a server or as a client user computer in a server-client user network environment, or as a peer computer system in a peer-to-peer (or distributed) network environment. The computer system 500 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a web appliance, or any other machine capable of executing a set of instructions (sequential or otherwise) that specify actions to be taken by that machine. In a particular embodiment, the computer system 500 may be implemented using electronic devices that provide video, audio, or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. Moreover, the computer system 500 may include a main memory 504 and a static memory 506, which can communicate with each other via a bus 508. As shown, the computer system 500 may further include a video display unit 510, such as a liquid crystal display (LCD), a flat panel display, a solid state display, or a lamp assembly of a projection system. Additionally, the computer system 500 may include an input device 512, such as a keyboard, and a cursor control device 514, such as a mouse. The computer system 500 may also include a drive unit 516, a signal generation device 518, such as a speaker or remote control, and a network interface device 520. Some computer systems 500 may not include an input device (e.g., a server may not include an input device).

In a particular embodiment, as depicted in FIG. 5, the drive unit 516 may include a computer-readable storage device 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable storage devices. The instructions 524 in the drive unit 516, the main memory 504, the static memory 506, the processor 502, or combinations thereof may include a SIP application device 526 to monitor information in a half call model communication session signaling path for a signal to initiate a central server-directed communication session.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure contemplates a computer-readable storage device 522 (e.g., a storage device) that stores instructions 524 or receives, stores and executes instructions 524, so that a device connected to a network 528 may communicate voice, video or data over the network 528. While the computer-readable storage device is shown to be a single device, the term "computer-readable storage device" includes a single device or multiple devices, such as a centralized or distributed database, and/or associated caches and servers that store one or more sets of instructions. The term "computer-readable device" shall also include any device that is capable of storing a set of instructions for execution by a processor or that cause a computer system to perform any one or more of the methods or operations disclosed herein.

In a particular non-limiting, exemplary embodiment, the computer-readable storage device may include a solid-state memory such as a memory card or other package that houses one or more non-volatile read-only memories. Further, the computer-readable storage device may be a random access memory or other volatile re-writable memory. Additionally, the computer-readable storage device may include a magneto-optical or optical medium, such as a disk or tapes or other storage device. Accordingly, the disclosure is considered to include any one or more of a computer-readable storage device and other equivalents and successor devices, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, and IEEE 802.x) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
sending, from a first device during a first communication session between the first device and a second device, an information request via the first communication session to a third device in a communication path of the first communication session, wherein the information request is for access information for a server-directed service that utilizes a second communication session between the first device and the second device, the second communication session independent of the first communication session and the server-directed service hosted by a server not in the communication path of the first communication session, and wherein the first communication session is used to enable a half call model communication service between the first device and the second device;
receiving an instruction at the first device from the third device to enable access to the server-directed service via the server;
sending, from the first device based on the instruction, an access request to the server to enable the server-directed service via the second communication session;
after sending the information request to the third device, terminating the first communication session; and
after terminating the first communication session, communicating with the second device based on the server-directed service using the second communication session.

2. The method of claim 1, wherein the first device is associated with a first service provider, wherein the second device is associated with a second service provider distinct from the first service provider, and wherein the half call model communication service comprises a session managed by the first service provider and the second service provider.

3. The method of claim 1, further comprising, prior to sending the information request, sending a communication message from the first device to the second device via the communication path as part of the first communication session, wherein the communication message is not sent to the server as part of the first communication session.

4. The method of claim 1, wherein, based on the information request, the third device is configured to cause a second instruction to be sent to the second device via the communication path, and wherein the second instruction enables the second device to access the server-directed service via the server.

5. The method of claim 1, wherein the second communication session is established for the first device and the second device based on the server receiving the access request from the first device and a second access request from the second device.

6. The method of claim 1, further comprising:
after receiving the instruction at the first device, establishing a direct connection between the first device and the second device; and
sending a communication message from the first device to the second device via the direct connection.

7. The method of claim 1, wherein the instruction includes a uniform resource locator to enable access to the server-directed service, and wherein the access request utilizes the uniform resource locator.

8. The method of claim 7, wherein the uniform resource locator corresponds to an address of the server that hosts the server-directed service.

9. The method of claim 1, further comprising:
in response to sending the information request, receiving, at the first device and from the third device, an indication of one or more services available to the first device, the one or more services including the server-directed service; and
sending, from the first device to the third device, a message indicating selection of the server-directed service from among the one or more services,
wherein the instruction is received at the first device in response to sending the message indicating selection of the server-directed service.

10. A computer-readable storage device comprising executable instructions that, when executed by a processor of a first device, cause the processor to perform operations comprising:
sending, during a first communication session between the first device and a second device, an information request via the first communication session to a third device in a communication path of the first communication session, wherein the information request is for access information for a server-directed service that utilizes a second communication session between the first device and the second device, the second communication session independent of the first communication session and the server-directed service hosted by a server not in the communication path of the first communication session, and wherein the first communication session is used to enable a half call model communication service between the first device and the second device;
receiving an instruction from the third device to enable access to the server-directed service via the server;
sending, based on the instruction, an access request to the server to enable the server-directed service via the second communication sessions;
after sending the information request to the third device, terminating the first communication session; and after terminating the first communication session, communicating with the second device based on the server-directed service using the second communication session.

11. The computer-readable storage device of claim 10, wherein the server-directed service comprises a gaming service.

12. The computer-readable storage device of claim 10, wherein the server-directed service comprises a file editing service.

13. The computer-readable storage device of claim 10, wherein, based on the information request, the third device is configured to cause a second instruction to be sent to the second device via the communication path, and wherein the second instruction enables the second device to access the server-directed service via the server.

14. The computer-readable storage device of claim 10, wherein the operations further comprise maintaining, by the first device, the first communication session after accessing the server-directed service.

15. A device comprising:
   a processor; and
   a memory accessible to the processor, the memory comprising instructions executable by the processor to initiate, perform, or control operations including:
      receiving, from a first device during a first communication session between the first device and a second device, an information request via the first communication session for access information for a server-directed service, wherein the server-directed service utilizes a second communication session between the first device and the second device, the second communication session independent of the first communication session and the server-directed service hosted by a server not in a communication path of the first communication session, and wherein the first communication session is used to enable a half call model communication service between the first device and the second device;
      sending a first instruction to the first device responsive to the information request, wherein the first instruction enables the first device to access the server-directed service; and
      sending a second instruction to the second device responsive to the information request, wherein the second instruction enables the second device to access the server-directed service,
      wherein the first communication session is terminated after sending of the information request by the first device, and
      wherein the first device communicates with the second device based on the server-directed service using the second communication session after termination of the first communication session.

16. The device of claim 15, wherein the operations further include:
   sending a consent request to the second device responsive to the information request; and
   receiving, from the second device before sending the first instruction, a consent indication to initiate the server-directed service.

17. The device of claim 16, wherein each of the first instruction and the second instruction includes a uniform resource locator of the server.

18. The device of claim 15, wherein the operations further include:
   generating, based on a first communication received from the first device, a second communication by removing the information request from the first communication; and
   sending the second communication to the second device.

* * * * *